United States Patent [19]

Beisch et al.

[11] 4,149,754
[45] Apr. 17, 1979

[54] WHEEL TRIM RETENTION

[75] Inventors: Hans R. Beisch, Amherstburg, Canada; Heinrich J. Hempelmann, Livonia, Mich.

[73] Assignee: Norris Industries, Inc., Ypsilanti, Mich.

[21] Appl. No.: 796,552

[22] Filed: May 13, 1977

[51] Int. Cl.² ............................................. B60B 7/06
[52] U.S. Cl. ................................ 301/37 R; 301/37 P
[58] Field of Search ............... 301/37 R, 37 P, 37 B, 301/37 PB, 37 TP, 37 CD, 37 C, 37 T, 108 R, 108 A; 24/73 B, 73 HC; 29/159 A

[56] References Cited
U.S. PATENT DOCUMENTS 4,063,783  12/1977  Spisak .......................... 301/37 R X

FOREIGN PATENT DOCUMENTS 86990  4/1966  France .................................. 24/73 B Primary Examiner—Robert J. Spar
Assistant Examiner—Charles A. Marmor
Attorney, Agent, or Firm—Harness, Dickey & Pierce

[57] ABSTRACT

This disclosure relates to a novel wheel trim retention for retaining wheel trim on the outer face of a vehicle wheel. The invention is especially adaptable for use with wheel trim made of plastic or the like. The retention system comprises specially designed spring clips which contain two members attached to a base portion which limit the radial and circumferential movement of the clip relative to the wheel trim, and a terminal portion which extends radially inwardly to limit the axial movement of the clip and help retain the clip on the wheel trim.

13 Claims, 7 Drawing Figures

U.S. Patent  Apr. 17, 1979  Sheet 1 of 2  4,149,754
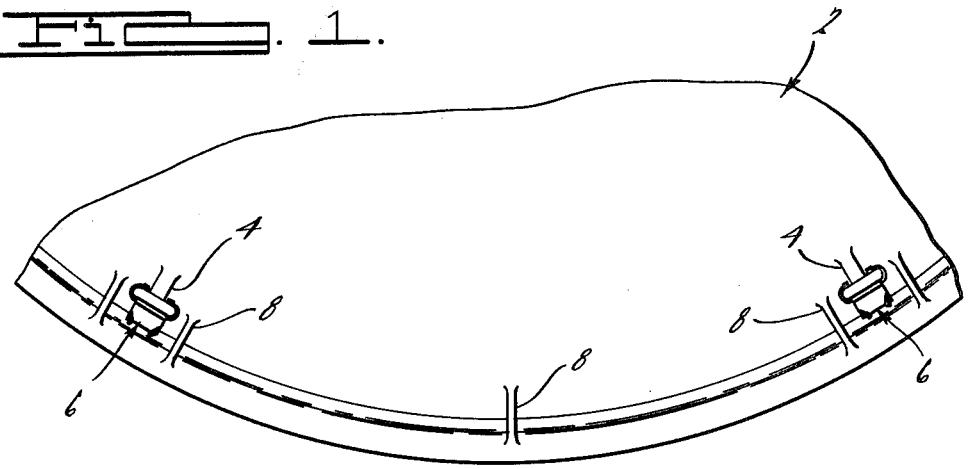
FIG. 1.
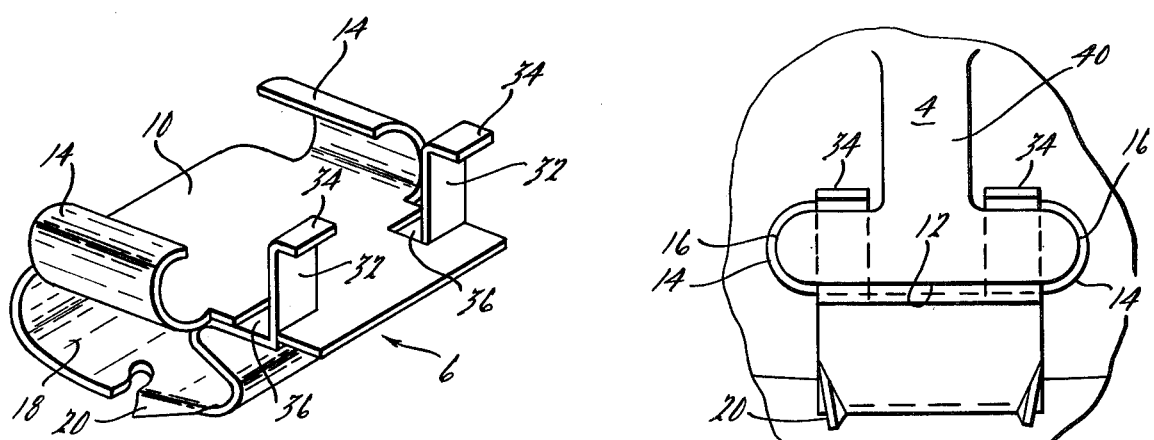
FIG. 2.
FIG. 4.
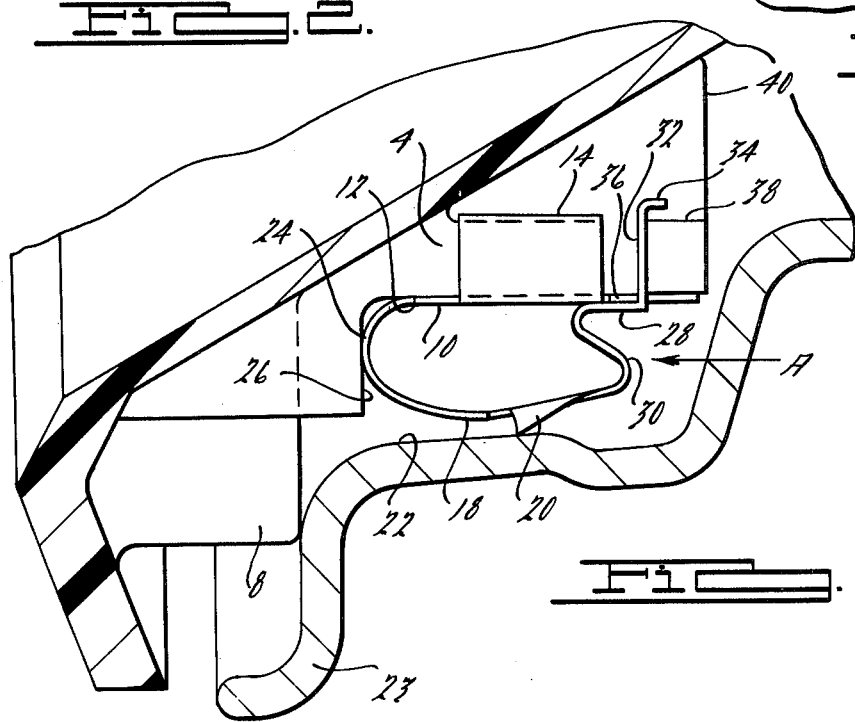
FIG. 3.

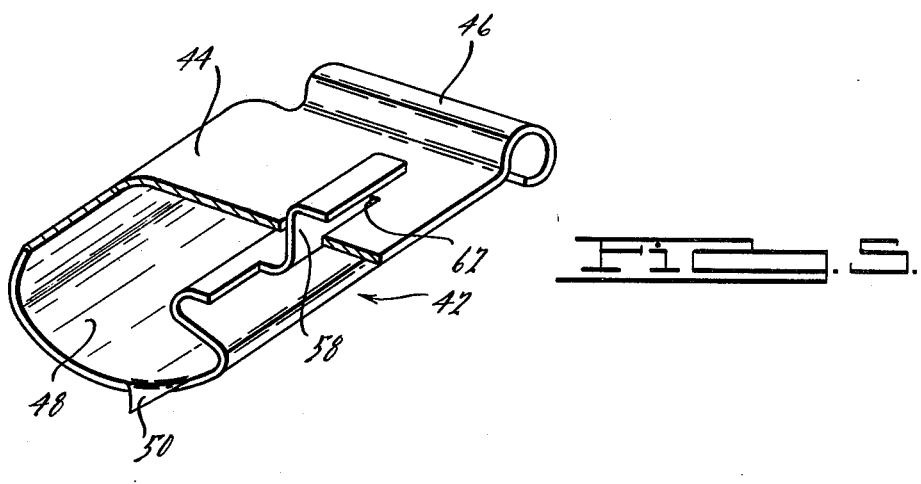
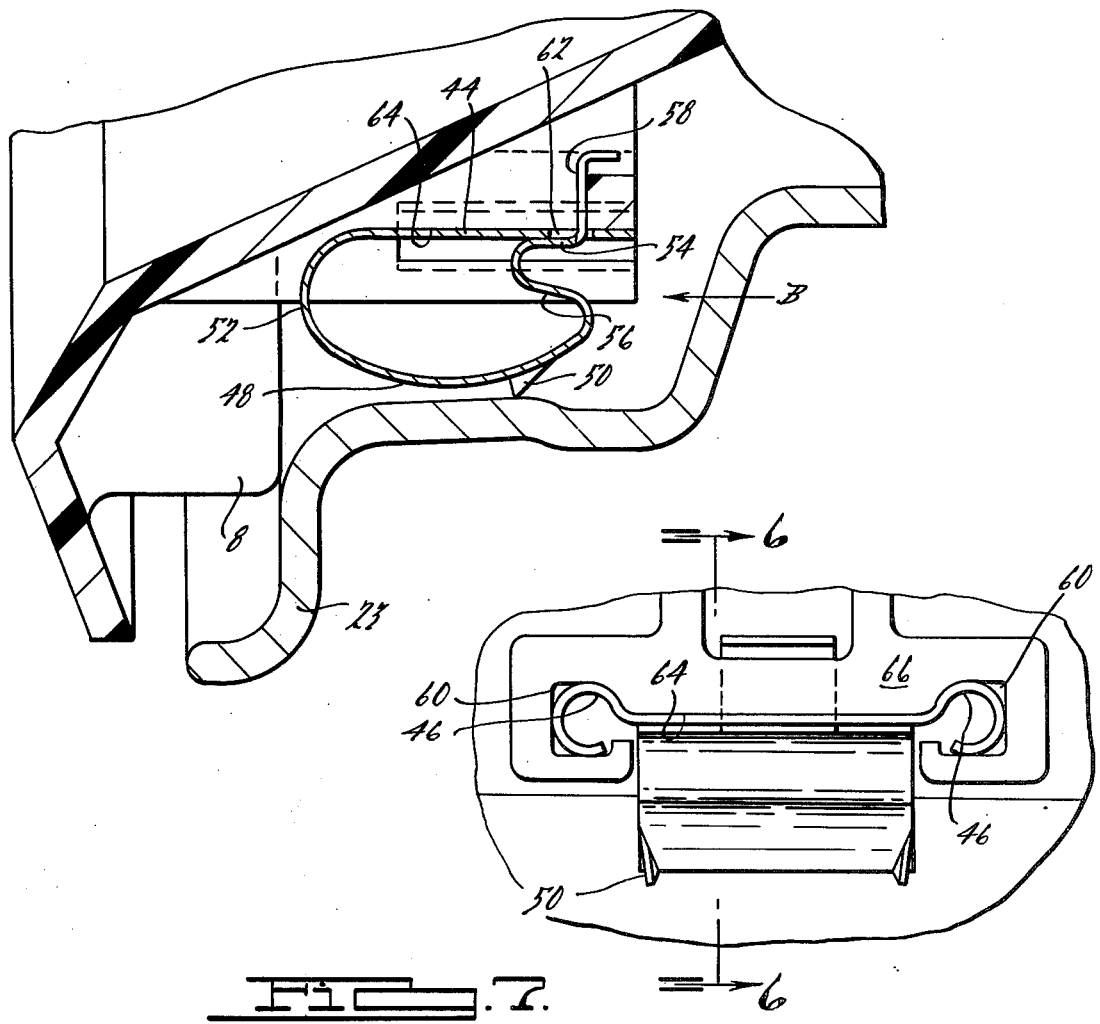

4,149,754

WHEEL TRIM RETENTION

BACKGROUND AND SUMMARY OF THE INVENTION

The present invention pertains primarily to retention or fastening means for retaining wheel trim on vehicle wheels.

Generally speaking, the function of automotive wheel trim is to decorate and/or protect the automotive wheel, and one of the major problems in the design of a commercially successful article of wheel trim concerns meeting the desired objectives of appearance, protection, location and retention in an article which may be economically mass produced. Retention means for retaining wheel trim on the outer face of a vehicle wheel must function to reliably retain such wheel trim in the presence of rather severe stress and strain, but must also be such as to allow easy removability of the wheel trim for access to the vehicle wheel. Such a combination of performance characteristics has proven to be very difficult to provide and still be economical to produce.

In recent years, cetain wheel trim has been fabricated of plastic since most plastic is relatively inexpensive, provides substantial weight reduction, and also provides greater flexibility in design that many of the stamped wheel trim materials of the past. The problems described above, however, are compounded with plastic because of its inherent stress limitations. Consequently, many of the prior art attempts to provide an adequate solution to the problem of plastic wheel trim retention at an economically attractive cost have not been successful.

It is a principal object of the present invention, therefore, to provide a novel retention means for retaining wheel trim, and particularly plastic wheel trim, on the outer face of a vehicle wheel, which retention is reliable, is easy to remove and yet provides superior retention, and is economical to manufacture.

Other objects, features and advantages of the present invention will become apparent from the subsequent description and the appended claims taken in conjunction with the accompanying drawings.

BRIEF DESCRIPTION OF THE DRAWINGS

FIG. 1 is a partial side elevational view of the back side of a wheel cover embodying the retention means of the present invention;

FIG. 2 is a perspective view of a preferred embodiment of the spring clip of the retention means of FIG. 1;

FIG. 3 is a fragmentary sectional view taken generally along the line 3—3 in FIG. 1, showing the wheel cover and the manner in which it is affixed to a vehicle wheel, the curved periphery of the wheel cover being illustrated as being uncurved in order to show other elements of the structure;

FIG. 4 is a partial view of the structure of FIG. 3 in the direction of arrow A of FIG. 3;

FIG. 5 is a perspective view of another preferred embodiment of the spring clip of the present invention;

FIG. 6 is a view similar to FIG. 3, but taken generally along the line 6—6 in FIG. 7 and showing the spring clip of FIG. 5; and FIG. 7 is a partial view of the structure of FIG. 6 in the direction of arrow B of FIG. 6.

DESCRIPTION OF THE PREFERRED EMBODIMENT

Generally speaking, the invention comprises a plastic wheel cover 2 containing a plurality of integrally formed mounting elements 4 which are equally spaced about the inside periphery of the wheel cover, each of which retains a metal spring clip 6. An integral support rib 8 is located on either side of the mounting elements 4 as well as midway between the mounting elements, which functions to axially position the wheel cover 2 on a vehicle wheel and also to help maintain the dimensional stability of the wheel cover.

In the preferred embodiment of the present invention shown in FIGS. 1-4, spring clip 6 is comprised of a base portion 10 which contacts an axially extending support surface 12 on mounting element 4. Base portion 10 contains a wheel trim engaging element comprised of two circumferentially spaced members 14 which extend from opposite edges of said base portion and wrap around two convex mating surfaces 16 of said mounting element to limit radial and circumferential movement of the clip with respect to the wheel trim. Spaced radially outwardly from said base portion 10 is a retention portion 18 which contains retention teeth 20 which function to bitingly engage the conventional flange 22 on wheel 23 when wheel cover 2 is applied to said wheel. Base portion 10 and retention portion 18 are connected by a hinge portion 24 which may contact an axially outer wall 26 integral with mounting element 4, as best shown in FIG. 3.

Spring clip 6 also comprises a force transmitting portion 28 which contacts base portion 10 and is connected to retention portion 18 by a connecting portion 30. Connected to the axially inner end of force transmitting portion 28 are terminal portions 32 which extend radially inwardly of support surface 12 and contact mounting element 4 to limit axial movement of the spring clip relative to the wheel trim and to help retain the clip on the wheel trim. Terminal portions 32 contain locking tabs 34 on their radially inner ends, said tabs being pushed through openings 36 in the base portion until the tabs clear the radially inner surface 38 of mounting element 4 and force transmitting portion 28 contacts base portion 10, at which time the clip 6 takes on the configuration of a substantially closed loop. The use of said tabs is optional and is not required for proper performance of spring clip 6, although the tabs do function to limit the movement of terminal portion 32 in a radially outward direction.

When wheel cover 2 is installed on a vehicle wheel or when force is appied to remove the wheel cover, whether intentional or the result of road obstacles, spring clip 6 functions to resiliently bias retention teeth 20 into continuous biting engagement with wheel flange 22 and thereby retain the wheel cover on the vehicle wheel. The tendency of the clip to collapse in the presence of radially inwardly directed forces is resisted by the engagement of force transmitting portion 28 against base portion 10. Opening of the clip is resisted by the engagement of terminal portions 32 and/or tabs 34 with the wheel cover. The S-shaped configuration of connecting portions 30 furnishes radial spring action to help maintain the resilient outward bias of teeth 20. Mounting element support rib 40 resists distortion of mounting element 4.

Another preferred embodiment of the present invention is shown in FIGS. 5-7, using a spring clip 42 which is similar to clip 6 in that it contains a base portion 44 containing a wheel trim engaging element comprised of two circumferentially spaced memebers 46, a retention portion 48 containing retention teeth 50, a hinge portion 52, a force transmitting portion 54, a connecting portion 56, and a terminal portion 58. However, clip 42 differs from clip 6 in two aspects. First, the wheel trim engaging members 46 are disposed within recesses 60, which are defined by concave mating surfaces rather than the convex wrap-around surfaces of clip 6. Recesses 60 are shaped and sized to accommodate members 46, which are slid into the recesses to thereby limit radial and circumferential movement of the clip with respect to the wheel cover. Second, base portion 44 of clip 42 contains only one opening 62 therethrough, rather than two openings as in clip 6, with opening 62 receiving terminal portion 58 when it is inserted past support surface 64 of mounting element 66. Clip 42 functions in the same manner as clip 6.

It should be noted that the retention means of the present invention is equally applicable to other types of wheel trim, such as trim rings, hubcaps, dust covers, etc., as well as various shapes thereof.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. Retention means for retaining wheel trim on the axially outer face of a vehicle wheel having an annular wheel flange, said retention means comprising:
   means defining a plurality of axially extending mounting elements on said wheel trim adapted to lie radially inwardly of the wheel flange when the wheel trim is retained on the wheel, each said element having a generally axially extending support surface thereon; and
   a spring clip associated with each said mounting element, each of said spring clips comprising:
      a base portion contacting said support surface, said base portion having a wheel trim engaging element adapted to mate with said mounting element in such manner as to thereby limit radial and circumferential movement of said spring clip with respect to said wheel trim,
      a retention portion spaced radially outwardly from said base portion, said retention portion containing a toothed retention member adapted to bitingly engage said wheel flange,
      a hinge portion connecting said base portion to said retention portion,
      a force transmitting portion contacting said base portion,
      a connecting portion connecting said retention portion to said force transmitting portion, and
      a terminal portion connected to said force transmitting portion, said terminal portion extending radially inwardly of said support surface and contacting said mounting element to limit axial movement of the spring clip relative to said wheel trim.

2. The retention means of claim 1 wherein said wheel trim engaging element of said base portion comprises two circumferentially spaced members extending from opposite edges of said base portion, respectively, and said mounting element comprises two circumferentially spaced mating surfaces, respectively engaging said members.

3. The retention means of claim 2 wherein said mating surfaces are convex and said members each wrap around one of said mating surfaces.

4. The retention means of claim 2 wherein each said mating surface is concave and defines a recess, and each said member is disposed in one of said recesses.

5. The retention means of claim 1 wherein said base portion contains at least one opening therethrough, said terminal portion extending radially inwardly through said opening.

6. The retention means of claim 1 wherein said connecting portion is S-shaped.

7. The retention means of claim 1 wherein said terminal portion comprises a locking tab on its radially inner end engageable with a portion of said mounting element so as to limit movement of said terminal portion in a radially outward direction.

8. The retention means of claim 1 wherein said hinge portion contacts an axially outer wall integral with each said mounting element.

9. Retention means for retaining wheel trim on the axially outerface of a vehicle wheel having an annular wheel flange, said retention means comprising:
   means defining a plurality of axially extending mounting elements on said wheel trim adapted to lie radially inwardly of the wheel flange when the wheel trim is retained on the wheel, each said element having a generally axially extending support surface and two circumferentially spaced surfaces, and
   a spring clip associated with each said mounting element, each of said spring clips comprising:
      a base portion having a wheel trim engaging element comprised of two circumferentially spaced members extending from opposite edges, respectively, of said base portion, each said engaging element being adapted to cooperate with the two circumferentially spaced surfaces of said mounting element to limit radial and circumferential movement of said spring clip with respect to said wheel trim,
      a retention portion spaced radially outwardly from said base portion, said retention portion containing a toothed retention member, a hinge portion connecting said base portion to said retention portion, and
      a force transmitting portion engaging said base portion and operative to bias said retention member into engagement with said wheel flange when said wheel trim is installed on a vehicle wheel.

10. The retention means of claim 9 wherein said spring clip further comprises:
    a connecting portion connecting said retention portion to said force transmitting portion, and
    a terminal portion connected to said force transmitting portion, said terminal portion extending radiably inwardly of said support surface and contacting said mounting element to limit axial movement of the spring clip relative to said wheel trim.

11. The retention means of claim 10 wherein said base portion contains at least one opening therethrough said terminal portion extending radially inwardly through said opening.

12. The retention means of claim 10 wherein said connecting portion is S-shaped.

13. The retention means of claim 10 wherein said terminal portion comprises a locking tab on its radially inner end adapted to limit movement of said terminal portion in a radially outward direction.

* * * * *

UNITED STATES PATENT AND TRADEMARK OFFICE
CERTIFICATE OF CORRECTION

PATENT NO. : 4,149,754
DATED : April 17, 1979
INVENTOR(S) : Hans R. Beisch and Heinrich J. Hempelmann It is certified that error appears in the above-identified patent and that said Letters Patent are hereby corrected as shown below:

Column 1, line 27: "that" should be --than--

Column 2, line 63: "portions" should be --portion--

Column 3, line 3: "memebers" should be --members--

Column 3, line 44
(Claim 1): after "such" insert --a--

Signed and Sealed this

Twenty-fourth Day of July 1979

[SEAL]

Attest:

LUTRELLE F. PARKER
Attesting Officer    Acting Commissioner of Patents and Trademarks